Sept. 11, 1951 S. A. COLLGERT ET AL 2,567,471
COLLET CHUCK
Filed Jan. 12, 1948 2 Sheets-Sheet 1

Inventors
S. A. Collgert
O. G. Nordquist
By Glascock Downing Seebold
Attys

Sept. 11, 1951  S. A. COLLGERT ET AL  2,567,471
COLLET CHUCK
Filed Jan. 12, 1948  2 Sheets-Sheet 2
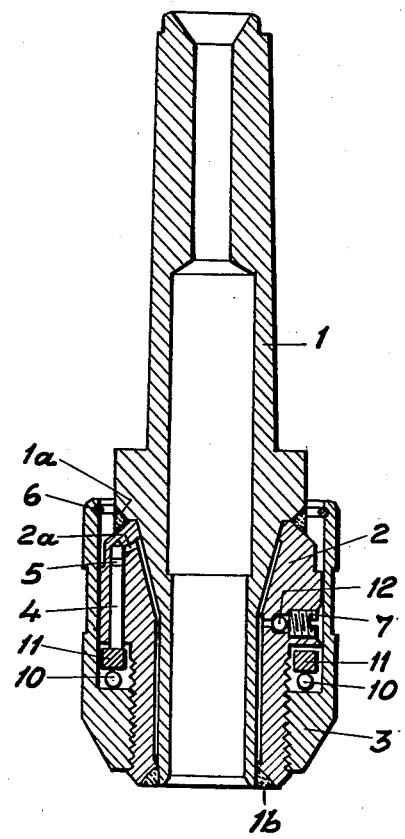
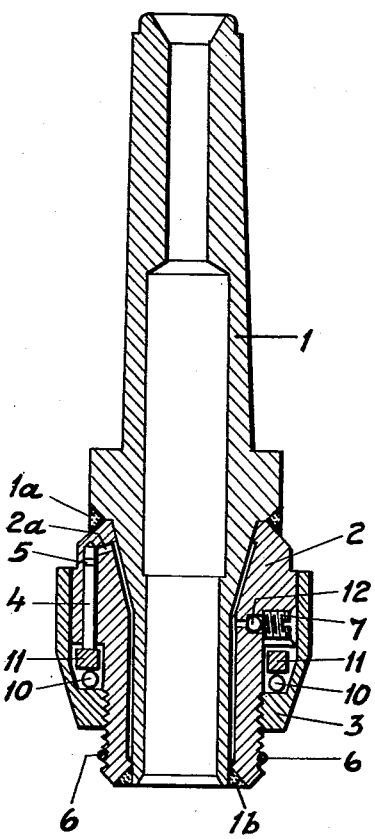
Inventors
S. A. Collgert
O. G. Nordqvist

UNITED STATES PATENT OFFICE 2,567,471

COLLET CHUCK

Sven Albin Collgert and Olle Gotthard Nordqvist, Karlskoga, Sweden

Application January 12, 1948, Serial No. 1,868
In Sweden January 13, 1947

8 Claims. (Cl. 279—41)

This invention relates to chucks for tightly securing drills, cutters and other tools of the type comprising a hollow chuck-body, having a thin-walled cylindrical part for receiving the tool, a relatively thick-walled outer sleeve, concentrically fixed to said part by welded seams to provide a fluid-tight closure and forming with said part an annular space for a pressure medium, acting to expand the thin-walled part so as to firmly engage said tool.

According to the invention the thick-walled outer sleeve is provided with a number of axial recesses, communicating through channels with said annular space and also containing pressure medium, and further with pistons, fitting accurately in said recesses and a ring, which is threadedly engaged with the outer sleeve to depress said pistons for causing the pressure medium to expand the thin-walled cylindrical part into firm engagement with the tool when said ring is screwed home in relation to said sleeve.

The accompanying drawings illustrate, by way of example, a number of constructions of the chuck according to the invention.

Figure 1:
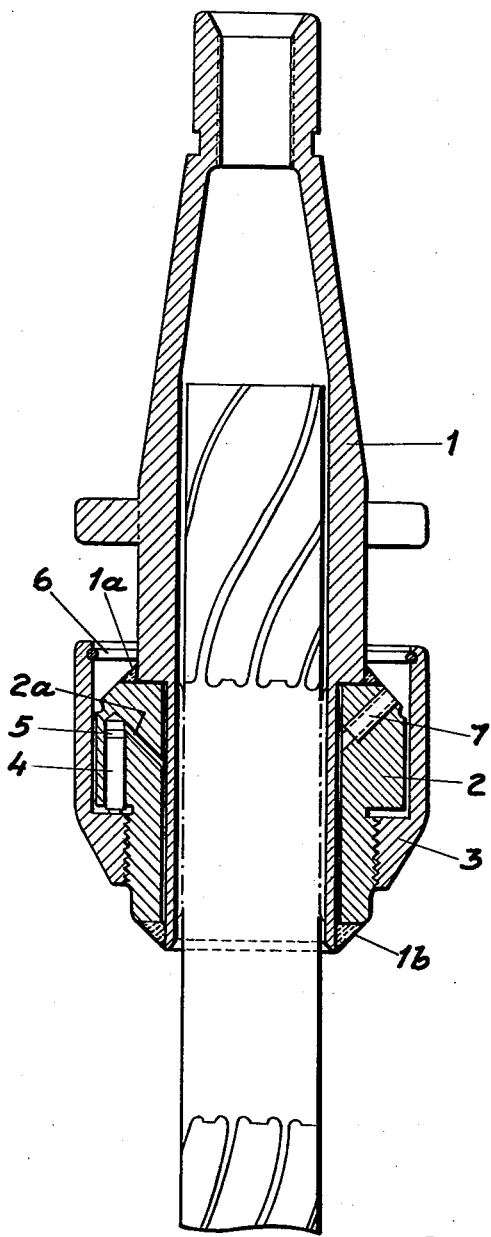
Figure 2:
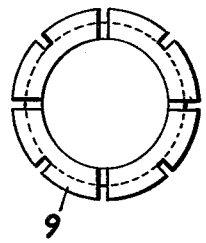
Figure 3:
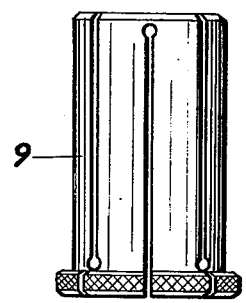

Fig. 1 shows a mill-chuck in cross-section and Figs. 2 and 3 a collet pertinent thereto. Figs. 4 and 5 show two modified structures of the chuck according to Fig. 1 also in cross-section.

Referring to the drawings the mill-chuck according to Fig. 1 comprises a chuck body 1, which in one end is shaped into a tapered shank and in the other into a cylindrical sleeve having a relatively thin wall, an outer annular part 2, fixed around said sleeve by welded seams 1a and 1b, said annular part being provided with threads, a ring-nut 3, a number of pistons 4 and packings 5, a split-ring 6 and an adjusting and sealing screw or plug 7.

The chuck-body 1 and the ring 2 are shaped in such a way, that, upon joining by the welded seams 1a and 1b, there is formed an annular space "a" measuring some hundredths or tenths of a mm. across (measure a in Fig. 1). Said space communicates through channels 2a with those recesses, in which the pistons 4 and packings 5 are located. By screwing home the ring-nut 3 the pistons are depressed in their respective recesses, the pressure medium occuring in said space being subjected to a high pressure. The material of the sleeve-shaped part of the chuck-body and of the ring 2 then is subjected to a pressure of the same height and a deformation is caused, decreasing the inner diameter of said sleeve 1 (exaggerated in the dash-and-dot lines in Fig. 1) and securing a shaft of a tool inserted in said sleeve. Upon loosening the ring-nut 3, however, said sleeve will reassume its original dimension whereupon the shaft of the tool will come loose. The adjusting screw 7, threaded on to the outer ring 2, is adapted to be removed when refilling the pressure medium, for escape of air and to permit the ring-nut 3 to be threaded on to an adequate initial position. The split-ring 6 is placed in a groove in the ring-nut 3 and has for its task to prevent unintended removal of same. It may be noted that said split-ring 6 may instead be placed in a groove in the sleeve 2 in its forward end as shown in Fig. 5 to cooperate with said ring-nut 3 for the same purpose.

In order to render possible securing of tools of different shaft-diameters the chuck is equipped with a number of cylindrical collets 9 of different inner diameters. Said collets, shown in Figs. 2 and 3 are made to a suitable size so as to facilitate inserting and removal of same, but nevertheless to prevent it from dropping by its own gravity. In constructions previously known the collets are outwardly tapered and held in position by a thrust-nut. Said nut must then be screwed out from the chuck-body at each time the collet shall be replaced. This is not necessitated by the chuck structure described above, involving a considerable timesaving in changing tools, by using said chuck. In small chucks having tapered collets the cutter will often be awry so as to warp, due to the fact, that the collet by drawing up the thrust-nut may be slid into oblique position. Said inconvenience is entirely avoided in the above chuck structure, wherein no adjustment in longitudinal direction takes place but instead equal pressure is applied around its entire periphery. An advantage is also provided thereby that the ring-nut 3, which is knurled, may be drawn up manually without key and tinsledge, required in structures previously known, in order to obtain a sufficiently rigid grip around the shank of the cutter.

In the modified constructions according to Figs. 4 and 5 similar parts are designated by the same reference characters as in Fig. 1. All of the three constructions are mainly built up in the same way, except that the embodiments according to Figs. 4 and 5 present a ball bearing device, comprising a number of balls 10 and a ring 11 interposed between the pistons 4 and the ring-nut 3, for the purpose of reducing friction between said parts 3 and 4 when turning the ring-nut in relation to the sleeve 2. In the construction according to Fig. 5, as aforementioned, the split ring 6 is further placed in a groove in the outer sleeve instead of in the ring-nut 3. Further the filling channel in the embodiments according to Figs. 4 and 5 is closed by means of a ball 12 and a threaded plug 7, instead of merely a plug, which latter is not always capable of providing a reliable seal.

The invention is not limited to the embodiments shown and described but may be varied in several ways within the scope of the basic inventive idea.

Having now described our invention, what we claim as new and desire to secure by Letters Patent is:

1. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, and a ring, which is threadedly engaged with the outer sleeve to depress said pistons for causing the pressure medium to expand the thin-walled cylindrical part into firm engagement with the tool, when said ring is screwed home in relation to said sleeve.

2. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to said sleeve, and a stop in the ring cooperating with said outer sleeve to prevent unintended removal of said ring.

3. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to the sleeve, a ball bearing interposed between said ring and said pistons for reduction of the friction therebetween, and a stop in the ring cooperating with said outer sleeve to prevent unintended removal of said ring.

4. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to said sleeve, and a stop, consisting of a split-ring located in an annular groove in the inner wall of said ring and cooperating with said outer sleeve to prevent unintended removal of said ring.

5. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provided a fluid-tight closure, said part and said sleeve forming between themselves an annular space for a pressure medium, a number of axial recesses in the outer-sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to said sleeve, and a stop, consisting of a split ring, located in an annular groove in the outer wall of said sleeve and cooperating with said ring to prevent unintended removal of the latter.

6. Chuck for tightly securing drills, cutters and the tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to the sleeve, a ball bearing interposed between said ring and said pistons for reduction of the friction therebetween, and a stop, consisting of a split ring, located in an annular groove in the outer wall of said sleeve and cooperating with said ring to prevent unintended removal of the latter.

7. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer-sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to said sleeve, and a filling channel closed with a plug in said sleeve.

8. Chuck for tightly securing drills, cutters and other tools comprising a hollow chuck-body having a thin-walled cylindrical part for receiving the tool, a relatively thick-walled outer sleeve concentrical with said part, said outer sleeve being at its ends fixed to the cylindrical part by means of welded seams to provide a fluid-tight closure, said part and said sleeve forming between themselves an annular space for a pressure medium, a number of axial recesses in the outer sleeve, communicating through channels with said annular space and also containing pressure medium, pistons fitting accurately in said recesses, a ring, which is threadedly engaged with the outer sleeve to depress said pistons for causing the pressure medium to expand the thin-walled cylindrical part into firm engagement with the tool, when said ring is screwed home in relation to the sleeve, a ball bearing interposed between said ring and said pistons for reduction of the friction therebetween, and a filling channel closed with a plug in said sleeve.

SVEN ALBIN COLLGERT.
OLLE GOTTHARD NORDQVIST.

REFERENCES CITED

The following references are of record in the file of this patent:

UNITED STATES PATENTS

| Number | Name | Date |
|---|---|---|
| 1,636,421 | Knott | July 19, 1927 |
| 1,772,210 | Dale | Aug. 5, 1930 |
| 2,118,485 | Brown | May 24, 1938 |
| 2,267,815 | Bush | Dec. 30, 1941 |
| 2,307,575 | Davis | Jan. 5, 1943 |